United States Patent
Mao et al.

(10) Patent No.: US 9,781,545 B2
(45) Date of Patent: Oct. 3, 2017

(54) WIRELESS COMMUNICATION SYSTEM AND RELATED WIRELESS DEVICE

(71) Applicant: REALTEK SEMICONDUCTOR CORP., Hsinchu (TW)

(72) Inventors: Wei-Feng Mao, Jiangsu (CN); Shi-Meng Zou, Jiangsu (CN); Chen-Hsing Lo, Taoyuan (TW); Chia-Chun Hung, Hsinchu (TW); Yu-Hsuan Liu, Taipei (TW); Chin-Chiu Li, Tainan (TW); Hou-Wei Lin, Taipei (TW); Yong Liu, Jiangsu (TW); Chun-Xia Guo, Jiangsu (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 159 days.

(21) Appl. No.: 14/684,993

(22) Filed: Apr. 13, 2015

(65) Prior Publication Data
US 2015/0296329 A1    Oct. 15, 2015

(30) Foreign Application Priority Data
Apr. 15, 2014 (CN) .......................... 2014 1 0151045

(51) Int. Cl.
*H04L 1/00* (2006.01)
*H04W 4/00* (2009.01)
(Continued)

(52) U.S. Cl.
CPC .......... *H04W 4/008* (2013.01); *H04W 8/005* (2013.01); *H04W 48/14* (2013.01); *H04W 76/02* (2013.01)

(58) Field of Classification Search
CPC ....... H04W 4/008; H04W 4/24; H04W 12/00; H04W 8/186; H04W 8/26; H04W 84/18
(Continued)

(56) References Cited

U.S. PATENT DOCUMENTS

| | | | |
|---|---|---|---|
| 2010/0317289 A1 | 12/2010 | Desai et al. | |
| 2011/0081860 A1* | 4/2011 | Brown ............... | H04N 1/00347 455/41.3 |
| 2012/0314631 A1 | 12/2012 | Yang et al. | |

FOREIGN PATENT DOCUMENTS

CN          101527911 A       9/2009

OTHER PUBLICATIONS

Anonymous, "Specification of the Bluetooth System", Covered Core Package version: 4.1, vol. 1, Section 3.3.1.3.1 of Chapter A of vol. 1, Section 2.3.1.1 of Chapter B of vol. 6, Section 2.3.1.3 of Chapter B of vol. 6, Section 2.3.1.4 of Chapter B of vol. 6, Dec. 3, 2013, pp. 53, 40, 41.

(Continued)

*Primary Examiner* — Dady Chery
(74) *Attorney, Agent, or Firm* — Birch, Stewart, Kolasch & Birch, LLP (57) ABSTRACT

A wireless communication system and related wireless devices are disclosed. The wireless communication system includes: a source wireless device configured to operably insert an auto-pairing request and one or more source Bluetooth device addresses into one or more predetermined advertising packets to form one or more target advertising packets, and configured to operably transmit the target advertising packets; and a destination wireless device configured to operably receive and parser the target advertising packets to extract the auto-pairing request and the one or more source Bluetooth device addresses. The destination wireless device performs an auto-pairing procedure with the source wireless device according to the auto-pairing request and the one or more source Bluetooth device addresses to establish a Bluetooth bond with the source wireless device. Each of the predetermined advertising packets is an advertising indication (ADV_IND) packet, a non-connectable (Continued)

advertising indication (ADV_NONCONN_IND) packet, or a discoverable advertisement indication (ADV_DISCOVER_IND) packet.

21 Claims, 8 Drawing Sheets (51) Int. Cl.
*H04W 8/00* (2009.01)
*H04W 76/02* (2009.01)
*H04W 48/14* (2009.01)

(58) Field of Classification Search
USPC ............ 455/41.2, 556.1, 566, 411, 558, 557, 455/41.3, 410; 370/338, 329, 341
See application file for complete search history.

(56) References Cited

OTHER PUBLICATIONS

Taiwanese Office Action and Search Report, dated Feb. 23, 2016, for Taiwanese Application No. 103119825 with a partial English translation.
Chinese Office Action and Search Report issued in Chinese Application No. 201410151045.9 dated Feb. 3, 2017, together with an English translation.

* cited by examiner

WIRELESS COMMUNICATION SYSTEM AND RELATED WIRELESS DEVICE

CROSS-REFERENCE TO RELATED APPLICATIONS

This application claims the benefit of priority to Patent Application No. 201410151045.9, filed in China on Apr. 15, 2014; the entirety of which is incorporated herein by reference for all purposes.

BACKGROUND

The disclosure generally relates to a wireless communication system and, more particularly, to a wireless communication system for simplifying the device pairing procedure and related wireless devices.

Conventional Bluetooth pairing procedure requires the user to issue a Bluetooth device scan command through appropriate input interface (e.g., a touch screen) and then to choose a target device to be connected from a list of available Bluetooth devices. Accordingly, the pairing procedure between two Bluetooth devices requires the user to conduct several manipulation steps so that a Bluetooth bond between the two Bluetooth devices can be established.

The aforementioned approach not only consumes considerable time of the user, but also demands the user to have comprehensive understanding of the user interface of the Bluetooth device. Apparently, the conventional Bluetooth pairing mechanism causes great inconvenience to the user in terms of manipulations, especially for elders, people with poor sight, or people having difficulty in finger manipulations.

SUMMARY

In view of the foregoing, it may be appreciated that a substantial need exists for methods and apparatuses that mitigate or reduce the problems above.

An example embodiment of a wireless communication system is disclosed, comprising a source wireless device and a destination wireless device. The source wireless device comprises: a first Bluetooth communication circuit; a packet generating circuit, coupled with the first Bluetooth communication circuit, configured to operably insert an auto-pairing request and one or more source Bluetooth device addresses into one or more predetermined advertising packets to form one or more target advertising packets; and a first Bluetooth control circuit, coupled with the first Bluetooth communication circuit and the packet generating circuit, configured to operably control the first Bluetooth communication circuit to transmit the one or more target advertising packets. The destination wireless device comprises: a second Bluetooth communication circuit, configured to operably receive the one or more target advertising packets; a packet parsing circuit, coupled with the second Bluetooth communication circuit, configured to operably parse the one or more target advertising packets to extract the auto-pairing request and the one or more source Bluetooth device addresses; and a second Bluetooth control circuit, coupled with the second Bluetooth communication circuit and the packet parsing circuit, configured to operably conduct a Bluetooth auto-pairing procedure with the source wireless device corresponding to the one or more source Bluetooth device addresses through the second Bluetooth communication circuit according to the auto-pairing request and the one or more source Bluetooth device addresses to establish one or more Bluetooth bonds between the first Bluetooth communication circuit and the second Bluetooth control circuit. Each of the one or more predetermined advertising packets is an advertising indication packet, a non-connectable advertising indication packet, or a discoverable advertisement indication packet.

Another example embodiment of a source wireless device for use in a wireless communication system is disclosed. The source wireless device comprises: a first Bluetooth communication circuit; a packet generating circuit, coupled with the first Bluetooth communication circuit, configured to operably insert an auto-pairing request and one or more source Bluetooth device addresses into one or more predetermined advertising packets to form one or more target advertising packets; and a first Bluetooth control circuit, coupled with the first Bluetooth communication circuit and the packet generating circuit, configured to operably control the first Bluetooth communication circuit to transmit the one or more target advertising packets; wherein each of the one or more predetermined advertising packets is an advertising indication packet, a non-connectable advertising indication packet, or a discoverable advertisement indication packet.

Another example embodiment of a destination wireless device for use in a wireless communication system is disclosed. The destination wireless device comprises: a second Bluetooth communication circuit, configured to operably receive one or more target advertising packets; a packet parsing circuit, coupled with the second Bluetooth communication circuit, configured to operably parse the one or more target advertising packets to extract an auto-pairing request and one or more source Bluetooth device addresses; and a second Bluetooth control circuit, coupled with the second Bluetooth communication circuit and the packet parsing circuit, configured to operably conduct a Bluetooth auto-pairing procedure with a source wireless device corresponding to the one or more source Bluetooth device addresses through the second Bluetooth communication circuit according to the auto-pairing request and the one or more source Bluetooth device addresses to establish one or more Bluetooth bonds between the second Bluetooth control circuit and a first Bluetooth communication circuit of the source wireless device; wherein each of the one or more predetermined advertising packets is an advertising indication packet, a non-connectable advertising indication packet, or a discoverable advertisement indication packet.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
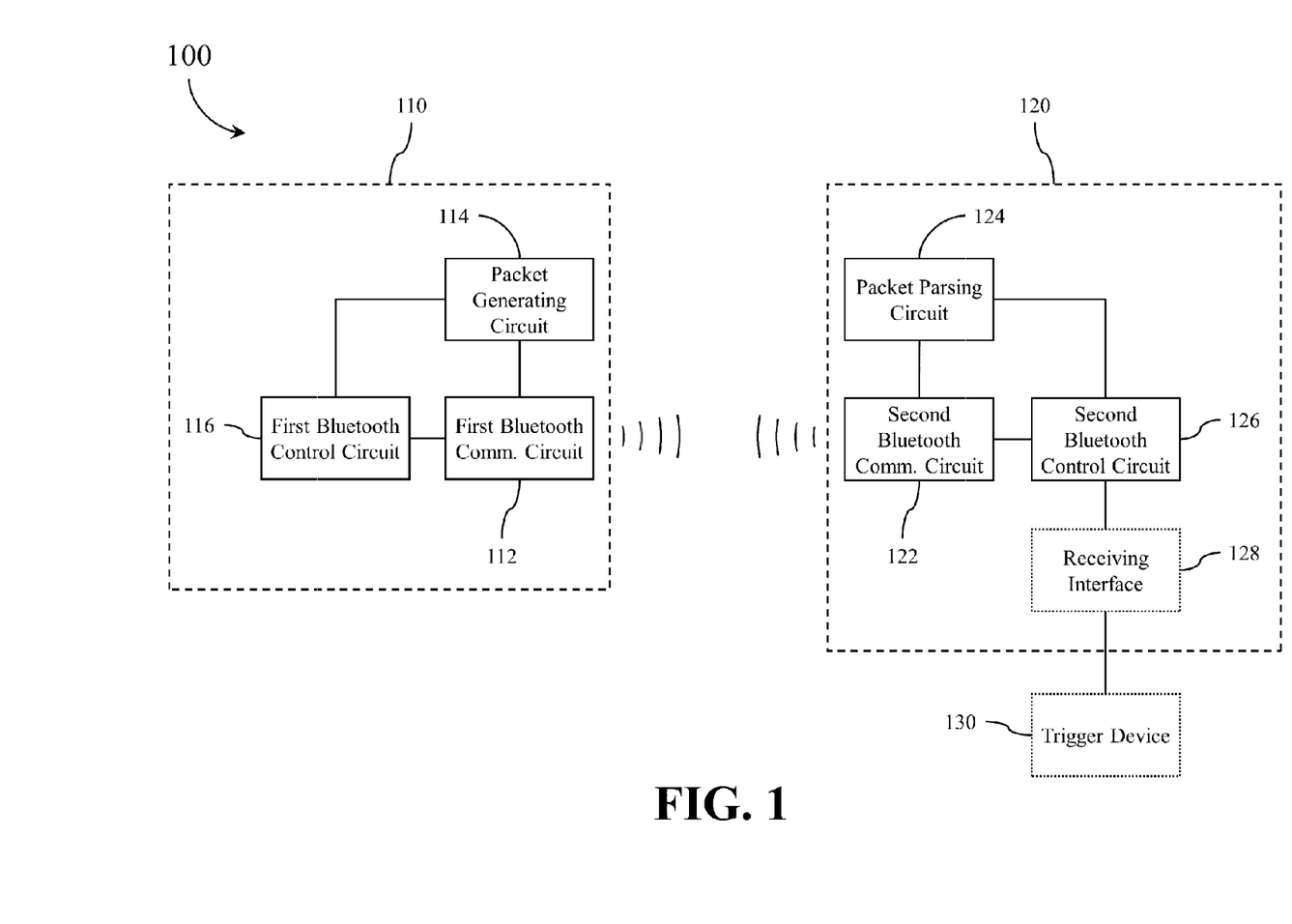
FIG. 1 shows a simplified functional block diagram of a wireless communication system according to a first embodiment of the present disclosure.

FIG. 1 shows a simplified functional block diagram of a wireless communication system 100 according to a first embodiment of the present disclosure. The wireless communication system 100 comprises a source wireless device 110 and a destination wireless device 120. Each of the source wireless device 110 and the destination wireless device 120 may be a stand-alone device, or may be a portion of circuitry integrated in other device.

In the embodiment of FIG. 1, the source wireless device 110 comprises a first Bluetooth communication circuit 112, a packet generating circuit 114, and a first Bluetooth control circuit 116. The destination wireless device 120 comprises a second Bluetooth communication circuit 122, a packet parsing circuit 124, a second Bluetooth control circuit 126, and a receiving interface 128.

In the source wireless device 110, the packet generating circuit 114 is coupled with the first Bluetooth communication circuit 112 and configured to operably insert an auto-pairing request and one or more source Bluetooth device addresses into one or more predetermined advertising packets to form one or more target advertising packets. The first Bluetooth control circuit 116 is coupled with the first Bluetooth communication circuit 112 and the packet generating circuit 114, and configured to operably control the first Bluetooth communication circuit 112 to transmit the one or more target advertising packets.

In practice, different functional blocks of the source wireless device 110 may be realized with separate circuits, or may be integrated into a single circuit chip. In addition, the first Bluetooth communication circuit 112 may be coupled with additional antenna devices (not shown) if needed.

In the destination wireless device 120, the second Bluetooth communication circuit 122 is configured to operably receive the packets transmitted from the first Bluetooth communication circuit 112. The packet parsing circuit 124 is coupled with the second Bluetooth communication circuit 122, and configured to operably parse the packets received by the second Bluetooth communication circuit 122. For example, when the one or more target advertising packets transmitted from the first Bluetooth communication circuit 112 are received by the second Bluetooth communication circuit 122, the packet parsing circuit 124 parses the one or more target advertising packets to extract the auto-pairing request and the one or more source Bluetooth device addresses. The second Bluetooth control circuit 126 is coupled with the second Bluetooth communication circuit 122 and the packet parsing circuit 124. The second Bluetooth control circuit 126 is configured to operably conduct a Bluetooth auto-pairing procedure with the source wireless device 110 corresponding to the one or more source Bluetooth device addresses through the second Bluetooth communication circuit 122 according to the auto-pairing request and the one or more source Bluetooth device addresses, so as to establish one or more Bluetooth bonds between the first Bluetooth communication circuit 112 and the second Bluetooth control circuit 126. The receiving interface 128 is coupled with the second Bluetooth control circuit 126 and configured to operably receive a user trigger signal generated by a trigger device 130.

In practice, different functional blocks of the destination wireless device 120 may be realized with separate circuits, or may be integrated into a single circuit chip. In addition, the second Bluetooth communication circuit 122 may be coupled with additional antenna devices (not shown) if needed.

The aforementioned trigger device 130 may be realized with various apparatuses configured to be able to generate corresponding user trigger signal in response to the user's simple manipulation, such as a button, a switch, a touch screen, a keyboard, a computer mouse, a voice-activated device, a gesture sensing device, a gyroscope, a circuitry adopting other signal triggering technology, or a combination of above devices. In practice, the trigger device 130 may be installed outside the destination wireless device 120, or may be integrated into the destination wireless device 120.

The term "predetermined advertising packet" as used throughout the description and the claims refers to an advertising indication (ADV_IND) packet, a non-connectable advertising indication (ADV_NONCONN_IND) packet, or a discoverable advertisement indication (ADV_DISCOVER_IND) packet. Similarly, the aforementioned term "target advertising packet" also refers to an advertising indication (ADV_IND) packet, a non-connectable advertising indication (ADV_NONCONN_IND) packet, or a discoverable advertisement indication (ADV_DISCOVER_IND) packet. The term "auto-pairing request" as used throughout the description and the claims refers to any indication information or command for requesting another wireless device to actively conduct a Bluetooth pairing procedure with the source wireless device 110.

The operations of the wireless communication system 100 will be further described in the following by reference to FIG. 2.

Figure 2:
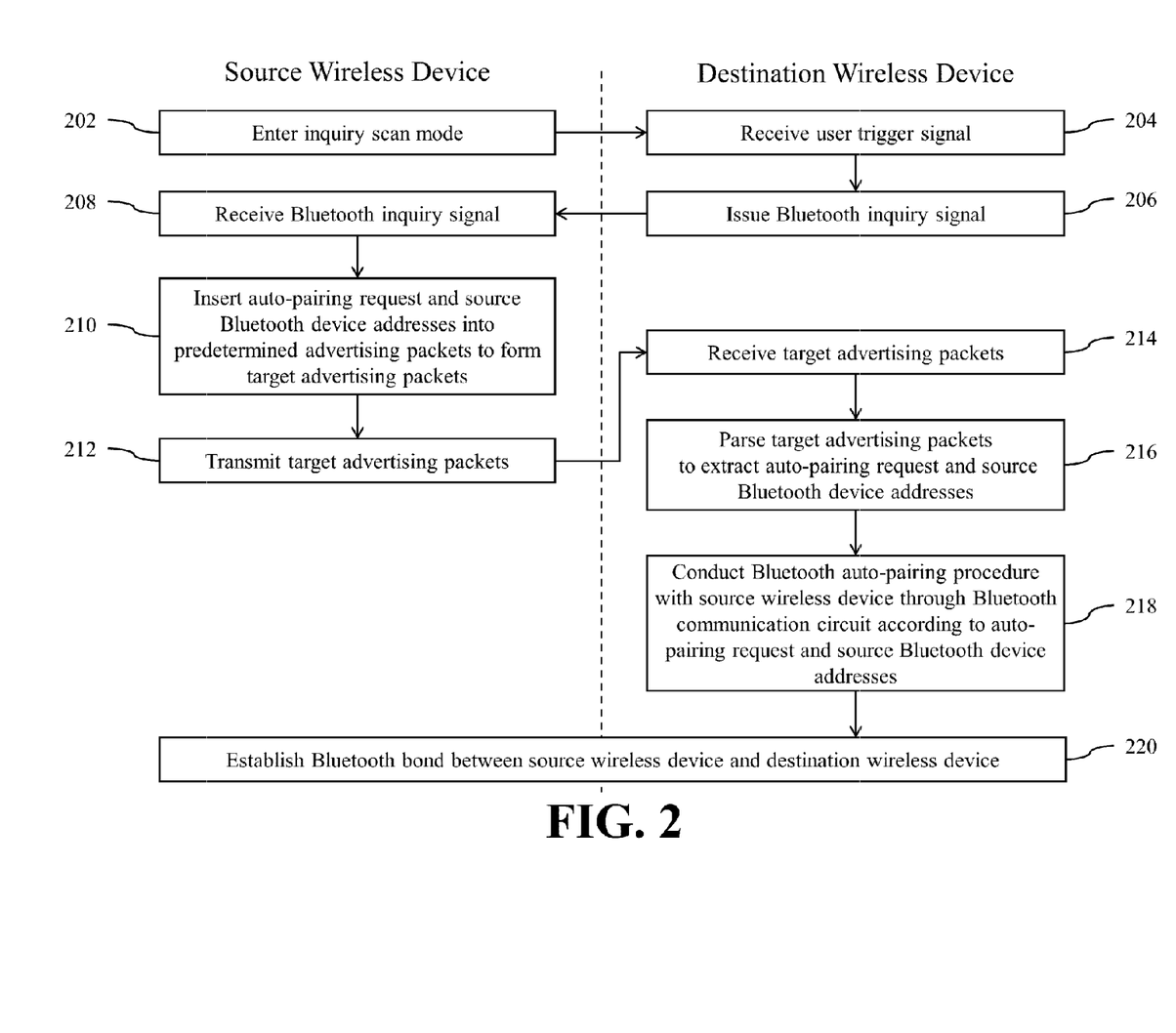
FIG. 2 shows a simplified flowchart of a method for conducting auto-pairing between wireless devices according to a first embodiment of the present disclosure.

FIG. 2 shows a simplified flowchart of a method for conducting auto-pairing between wireless devices according to a first embodiment of the present disclosure. In FIG. 2 and subsequent flowcharts, operations within a column under the name of a specific device are operations to be performed by the specific device. For example, operations within a column under the label "Source Wireless Device" are operations to be performed by the source wireless device 110, operations within a column under the label "Destination Wireless Device" are operations to be performed by the destination wireless device 120, and so forth.

In the operation 202, the first Bluetooth control circuit 116 controls the first Bluetooth communication circuit 112 to enter an inquiry scan mode to detect whether any Bluetooth device issues inquiry signals.

Afterwards, when the user wants to instruct the destination wireless device 120 to automatically conduct Bluetooth pairing with other Bluetooth devices, the user may conduct predetermined manipulation to the trigger device 130 so as to instruct the trigger device 130 to generate a corresponding user trigger signal. At this time, the receiving interface 128 performs the operation 204 to receive the user trigger signal generated by the trigger device 130 and to notify the second Bluetooth control circuit 126 regarding the same.

When the user trigger signal transmitted from the trigger device 130 is received by the receiving interface 128, the second Bluetooth control circuit 126 performs the operation 206 to control the second Bluetooth communication circuit 122 to issue a Bluetooth inquiry signal.

In the operation 208, the first Bluetooth communication circuit 112 of the source wireless device 110 receives the Bluetooth inquiry signal transmitted from the second Bluetooth communication circuit 122.

At this time, the packet generating circuit 114 performs the operation 210 to insert the aforementioned auto-pairing request and one or more source Bluetooth device addresses corresponding to the source wireless device 110 into one or more predetermined advertising packets to form one or more target advertising packets. In practice, the packet generating circuit 114 may insert the auto-pairing request and the one or more source Bluetooth device addresses into the advertisement data (AdvData) fields in the payload of the one or more predetermined advertising packets to form the one or more target advertising packets. For example, the packet generating circuit 114 may define the data type of one or more extended inquiry response (EIR) data structures in the advertisement data fields to be vendor specific messages, and inserts the auto-pairing request and the one or more source Bluetooth device addresses into the one or more EIR data structures.

Depending upon the versions of Bluetooth standard supported by the source wireless device 110, the source wireless device 110 may have one or more than one Bluetooth device addresses. For example, in the embodiment where the source wireless device 110 only supports Bluetooth 2.0, the source wireless device 110 may have only a single Bluetooth device address. In the embodiment where the source wireless device 110 simultaneously support both Bluetooth 2.0 and Bluetooth 4.0 (a.k.a. Bluetooth Low Energy, BLE), the source wireless device 110 may have two different Bluetooth device addresses. In the operation 210, the packet generating circuit 114 may insert some or all the Bluetooth device addresses of the source wireless device 110 into the target advertising packets.

In the operation 212, the first Bluetooth control circuit 116 controls the first Bluetooth communication circuit 112 to transmit the one or more target advertising packets to the second Bluetooth communication circuit 122 in response to the Bluetooth inquiry signal.

In the operation 214, the second Bluetooth communication circuit 122 receives the one or more target advertising packets transmitted from the first Bluetooth communication circuit 112.

In the operation 216, the packet parsing circuit 124 parses the one or more target advertising packets received by the second Bluetooth communication circuit 122 to extract the auto-pairing request and the one or more source Bluetooth device addresses. For example, in the previous embodiment where the packet generating circuit 114 inserts the auto-pairing request and the one or more source Bluetooth device addresses into the EIR data structures of the target advertising packets, the packet parsing circuit 124 may extract the auto-pairing request and the one or more source Bluetooth device addresses from corresponding positions within the advertisement data fields in the payload of the one or more target advertising packets.

In the operation 218, the second Bluetooth control circuit 126 conducts a Bluetooth auto-pairing procedure with the source wireless device 110 through the second Bluetooth communication circuit 122 according to the auto-pairing request and the one or more source Bluetooth device addresses. According to the auto-pairing request the second Bluetooth control circuit 126 may be notified of that Bluetooth circuits corresponding to the one or more source Bluetooth device addresses allow other devices to conduct Bluetooth pairing with the source wireless device 110. Therefore, the second Bluetooth control circuit 126 automatically attempts to conduct the Bluetooth pairing procedure with respective Bluetooth circuits corresponding to each of the received source Bluetooth device addresses through the second Bluetooth communication circuit 122, instead of generating a list of available Bluetooth devices for the user to choose. In other words, the destination wireless device 120 requires no user intervention or interaction in the operation 218.

When the aforementioned Bluetooth auto-pairing procedure is accomplished, the second Bluetooth control circuit 126 and the first Bluetooth control circuit 116 perform the operation 220 to establish one or more Bluetooth bonds between the source wireless device 110 and the destination wireless device 120. That is, one or more Bluetooth bonds between the first Bluetooth communication circuit 112 and the second Bluetooth communication circuit 122 are established in the operation 220. For example, in the embodiment where only Bluetooth 2.0 is supported by both the source wireless device 110 and the destination wireless device 120, the second Bluetooth control circuit 126 and the first Bluetooth control circuit 116 may establish a basic rate bond (BR bond) or an enhanced data rate bond (EDR bond) in the operation 220. In the embodiment where Bluetooth 2.0 and BLE are simultaneously supported by both the source wireless device 110 and the destination wireless device 120, the second Bluetooth control circuit 126 and the first Bluetooth control circuit 116 may further establish a BLE bond in addition to a BR/EDR bond in the operation 220.

It can be appreciated from the foregoing descriptions that when the source wireless device 110 operates under the inquiry scan mode, the user only needs to conduct a simple manipulation to the trigger device 130 coupled with the destination wireless device 120, such as pressing a button, activating a switch, or the like. Then the destination wireless device 120 would automatically initiate the Bluetooth pairing procedure with other Bluetooth devices to establish Bluetooth bonds. In the entire processes of conducting the Bluetooth pairing and establishing the Bluetooth bonds, the user is not required to issue the Bluetooth scan command or to choose a target device to be paired. As a result, the required user intervention or interaction is greatly reduced to the minimal level.

Therefore, the disclosed structure of the wireless communication system 100 effectively simplifies the Bluetooth pairing procedure between two wireless devices, and greatly improves the utilization convenience for the user.

Please note that in the previous embodiments, the destination wireless device 120 automatically initiates the Bluetooth pairing procedure based on the trigger of the trigger device 130 manipulation by the user. But this is merely an exemplary structure, rather than a restriction to the practical implementations.

Figure 3:
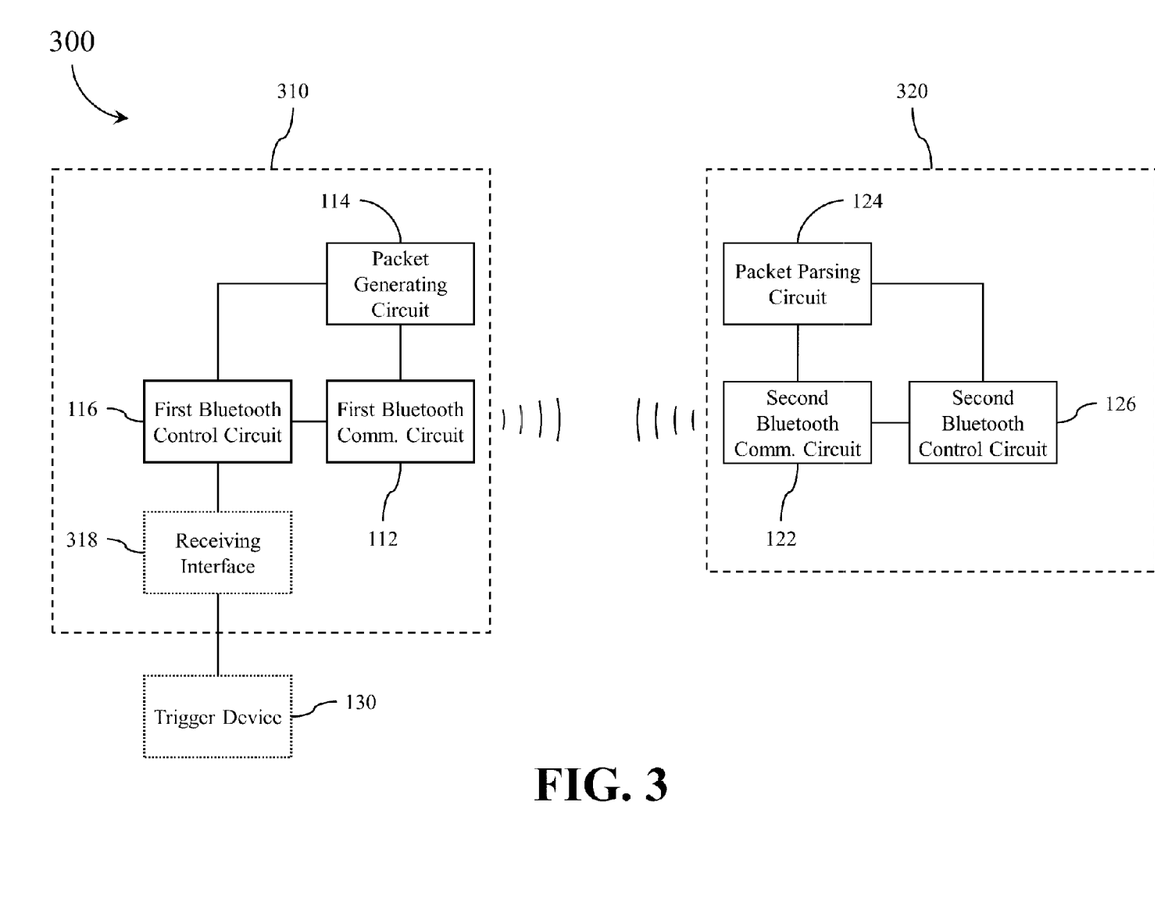
FIG. 3 shows a simplified functional block diagram of a wireless communication system according to a second embodiment of the present disclosure.

For example, FIG. 3 shows a simplified functional block diagram of a wireless communication system 300 according to a second embodiment of the present disclosure. The wireless communication system 300 comprises a source wireless device 310 and a destination wireless device 320. The source wireless device 310 is similar to the aforementioned source wireless device 110, but the source wireless device 310 comprises an additional receiving interface 318. The receiving interface 318 is coupled with the first Bluetooth control circuit 116 and configured to operably receive a user trigger signal generated by the trigger device 130.

The destination wireless device 320 is similar to the aforementioned destination wireless device 120, but the receiving interface 128 is omitted in the destination wireless device 320.

The foregoing descriptions regarding the implementations, connections, and operations of other corresponding functional blocks in the wireless communication system 100 are also applicable to the wireless communication system 300. For the sake of brevity, those descriptions will not be repeated here.

The operations of the wireless communication system 300 will be further described in the following by reference to FIG. 4.

Figure 4:
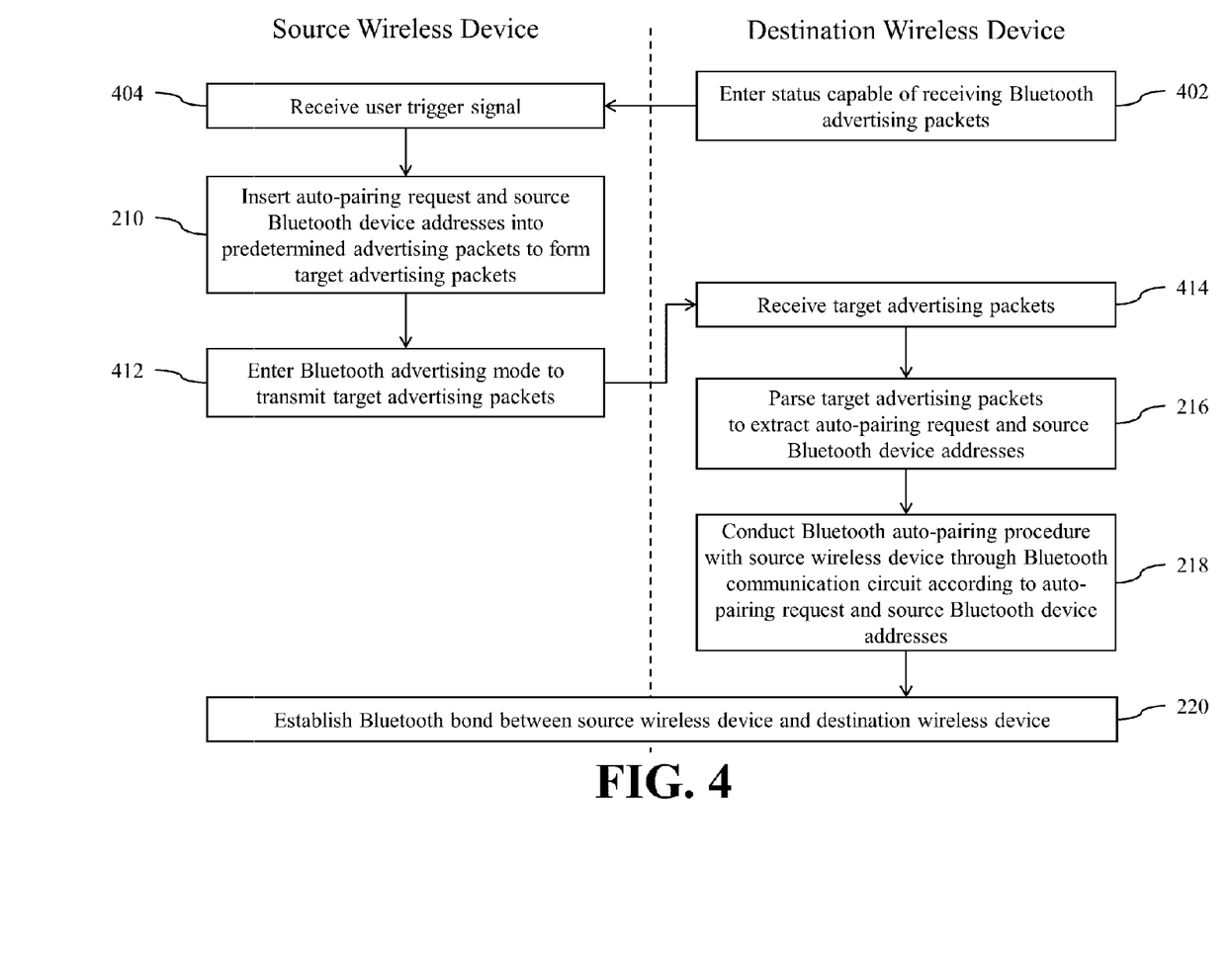
FIG. 4 shows a simplified flowchart of a method for conducting auto-pairing between wireless devices according to a second embodiment of the present disclosure.

FIG. 4 shows a simplified flowchart of a method for conducting auto-pairing between wireless devices according to a second embodiment of the present disclosure.

In the operation 402, the second Bluetooth control circuit 126 controls the second Bluetooth communication circuit 122 to enter a status capable of receiving Bluetooth advertising packets.

Afterward, when the user wants to instruct the source wireless device 310 to automatically conduct a Bluetooth pairing with other Bluetooth device, the user may conduct predetermined manipulation to the trigger device 130 so as to instruct the trigger device 130 to generate a corresponding user trigger signal. At this time, the receiving interface 318 performs the operation 404 to receive the user trigger signal generated by the trigger device 130 and to notify the first Bluetooth control circuit 116 regarding the same.

When the user trigger signal transmitted from the trigger device 130 is received by the receiving interface 318, the first Bluetooth control circuit 116 performs the aforementioned operation 210.

In the operation 412, the first Bluetooth control circuit 116 controls the first Bluetooth communication circuit 112 to enter a Bluetooth advertising mode to transmit the one or more target advertising packets. For example, when the source wireless device 310 supports BLE standard, the first Bluetooth control circuit 116 in the operation 412 may control the first Bluetooth communication circuit 112 to enter a BLE advertising mode to transmit the one or more target advertising packets.

In the operation 414, the second Bluetooth communication circuit 122 receives the one or more target advertising packets transmitted from the first Bluetooth communication circuit 112.

Then, the destination wireless device 320 performs the aforementioned operations 216 and 218.

As described previously, the second Bluetooth control circuit 126 automatically attempts to conduct the Bluetooth pairing procedure with respective Bluetooth circuits corresponding to each of the received source Bluetooth device addresses through the second Bluetooth communication circuit 122 in the operation 218, instead of generating a list of available Bluetooth devices for the user to choose. In other words, the destination wireless device 120 requires no user intervention or interaction in the operation 218.

When the aforementioned Bluetooth auto-pairing procedure is accomplished, the second Bluetooth control circuit 126 and the first Bluetooth control circuit 116 conduct the aforementioned operation 220 to establish one or more Bluetooth bonds between the source wireless device 310 and the destination wireless device 320. That is, one or more Bluetooth bonds between the first Bluetooth communication circuit 112 and the second Bluetooth communication circuit 122 are established in the operation 220.

It can be appreciated from the foregoing descriptions that when the destination wireless device 320 operates in the status capable of receiving Bluetooth advertising packets, the user only needs to conduct a simple manipulation to the trigger device 130 coupled with the source wireless device 310, such as pressing a button, activating a switch, or the like. Then the source wireless device 310 would automatically initiate the Bluetooth pairing procedure with other Bluetooth devices to establish Bluetooth bonds. In the entire processes of conducting the Bluetooth pairing and establishing the Bluetooth bonds, the user is not required to issue the Bluetooth scan command or to choose a target device to be paired. Hence, the required user intervention or interaction is greatly reduced to the minimal level.

Therefore, the disclosed structure of the wireless communication system 300 effectively simplifies the Bluetooth pairing procedure between two wireless devices, and greatly improves the utilization convenience for the user.

Figure 5:
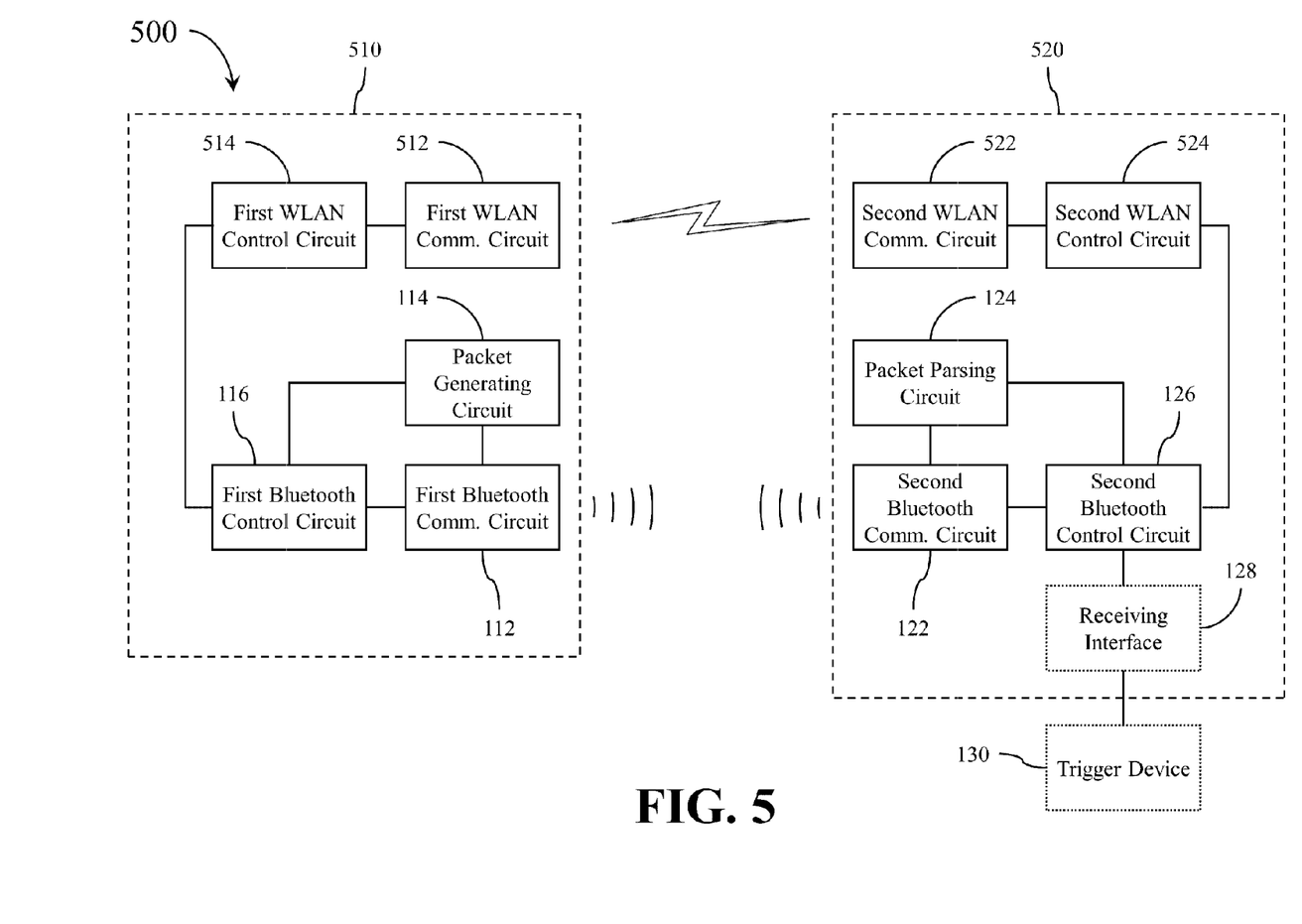
FIG. 5 shows a simplified functional block diagram of a wireless communication system according to a third embodiment of the present disclosure.

FIG. 5 shows a simplified functional block diagram of a wireless communication system 500 according to a third embodiment of the present disclosure. The wireless communication system 500 comprises a source wireless device 510 and a destination wireless device 520. The source wireless device 510 is similar to the aforementioned source wireless device 110, but the source wireless device 510 further comprises a first wireless local area network (WLAN) communication circuit 512 and a first WLAN control circuit 514. The first WLAN control circuit 514 is coupled with the first Bluetooth control circuit 116 and the first WLAN communication circuit 512.

In practice, different functional blocks of the source wireless device 510 may be realized with separate circuits, or may be integrated into a single circuit chip. In addition, each of the first Bluetooth communication circuit 112 and the first WLAN communication circuit 512 may be coupled with additional antenna devices (not shown) if needed.

The destination wireless device 520 is similar to the aforementioned destination wireless device 120, but the destination wireless device 520 further comprises a second WLAN communication circuit 522 and a second WLAN control circuit 524. The second WLAN control circuit 524 is coupled with the second Bluetooth control circuit 126 and the second WLAN communication circuit 522.

Similarly, different functional blocks of the destination wireless device 520 may be realized with separate circuits, or may be integrated into a single circuit chip. In addition, each of the second Bluetooth communication circuit 122 and the second WLAN communication circuit 522 may be coupled with additional antenna devices (not shown) if needed.

The foregoing descriptions regarding the implementations, connections, and operations of other corresponding functional blocks in the wireless communication system 100 are also applicable to the wireless communication system 500. For the sake of brevity, those descriptions will not be repeated here.

The operations of the wireless communication system 500 will be further described in the following by reference to FIG. 6.

Figure 6:
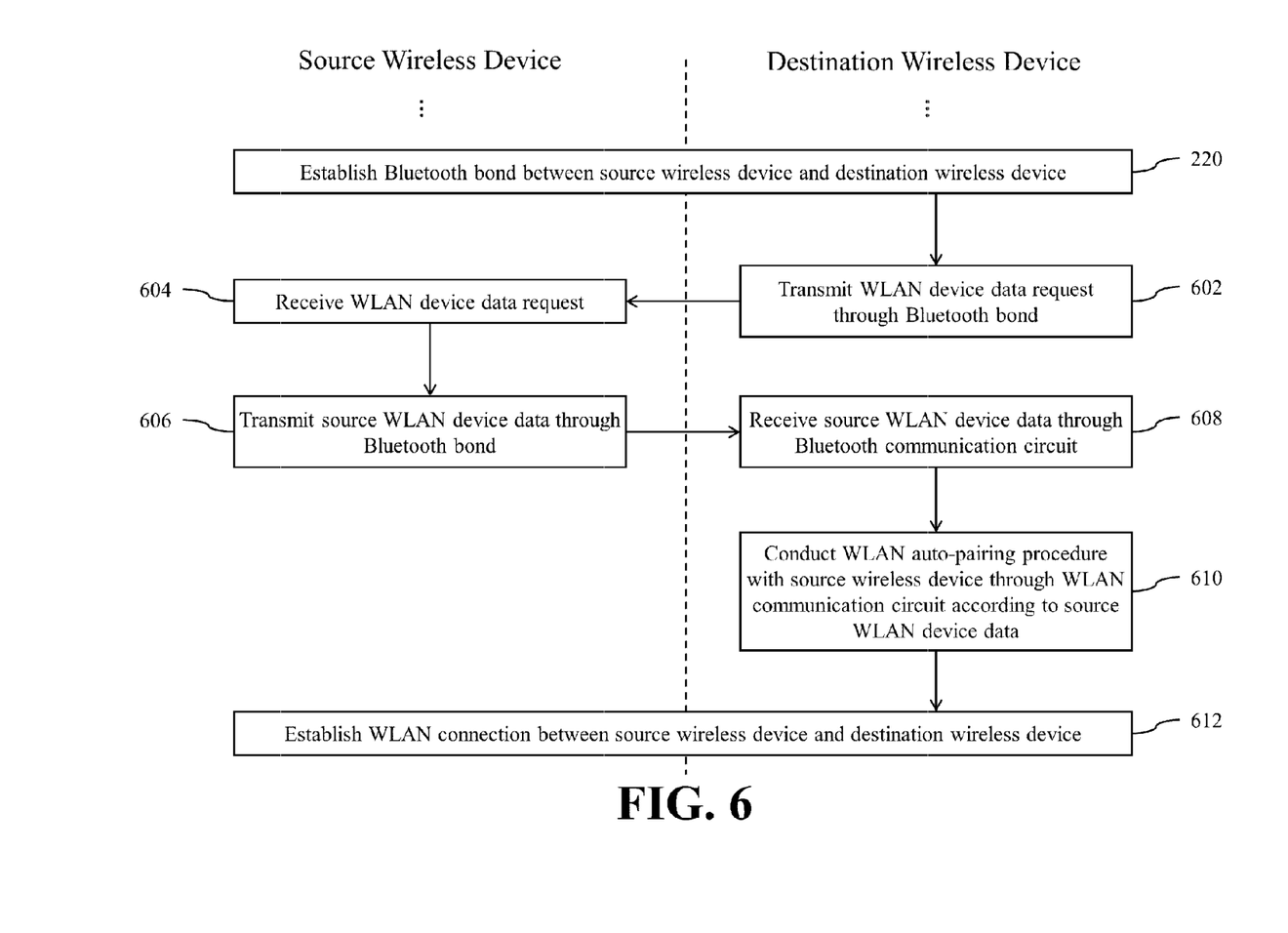
FIG. 6 shows a simplified flowchart of a method for conducting auto-pairing between wireless devices according to a third embodiment of the present disclosure.

FIG. 6 shows a simplified flowchart of a method for conducting auto-pairing between wireless devices according to a third embodiment of the present disclosure.

When the user wants to instruct the destination wireless device 520 to automatically conduct WLAN pairing with other wireless devices, the user may conduct predetermined manipulation to the trigger device 130 so as to instruct the trigger device 130 to generate a corresponding user trigger signal. At this time, the destination wireless device 520 and the source wireless device 510 first conduct the operations 202~220 illustrated in FIG. 2 to accomplish a Bluetooth pairing procedure and establish one or more Bluetooth bonds between the source wireless device 510 and the destination wireless device 520. That is, the destination wireless device 520 and the source wireless device 510 establish one or more Bluetooth bonds between the first Bluetooth communication circuit 112 and the second Bluetooth communication circuit 122.

Then, the second WLAN control circuit 524 performs the operation 602 to instruct the second Bluetooth control circuit 126 to transmit a WLAN device data request to the source wireless device 510 through the one or more established Bluetooth bonds. At this time, the second Bluetooth control circuit 126 controls the second Bluetooth communication circuit 122 to transmit the WLAN device data request to the first Bluetooth communication circuit 112 of the source wireless device 510 through the Bluetooth bonds.

In the operation 604, the first Bluetooth communication circuit 112 receives the WLAN device data request transmitted from the second Bluetooth communication circuit 122 through the Bluetooth bonds. At this time, the first Bluetooth control circuit 116 transmits the WLAN device data request to the first WLAN control circuit 514.

In the operation 606, the first WLAN control circuit 514 instructs the first Bluetooth control circuit 116 to transmit a source WLAN device data to the destination wireless device 520 through the aforementioned one or more Bluetooth bonds. At this time, the first Bluetooth control circuit 116 controls the first Bluetooth communication circuit 112 to transmit the source WLAN device data to the second Bluetooth communication circuit 122 of the destination wireless device 520 through the aforementioned Bluetooth bonds. In practice, the source WLAN device data may comprise a network protocol address (e.g., IP address) of the source wireless device 510, a physical address (e.g., MAC address) of the source wireless device 510, a Service Set Identifier (SSID) of the source wireless device 510, a data rate of the source wireless device 510, or other data for use in conducting the WLAN pairing procedure.

In the operation 608, the second Bluetooth control circuit 126 receives the source WLAN device data transmitted from the first Bluetooth communication circuit 112 through the second Bluetooth communication circuit 122. At this time, the second Bluetooth control circuit 126 transmits the source WLAN device data to the second WLAN control circuit 524.

In the operation 610, the second WLAN control circuit 524 conducts a WLAN auto-pairing procedure with the source wireless device 510 through the second WLAN communication circuit 522 according to the source WLAN device data. The second WLAN control circuit 524 may obtain the network protocol address of the source wireless device 510, the physical address of the source wireless device 510, the SSID of the source wireless device 510, the data rate of the source wireless device 510, or other data for use in conducting the WLAN pairing procedure based on the source WLAN device data. Accordingly, the second WLAN control circuit 524 automatically conducts the WLAN pairing procedure with the source wireless device 510 through the second WLAN communication circuit 522, but does not generate a list of available WLAN devices for the user to choose. In other words, the destination wireless device 520 requires no user intervention or interaction in the operation 610.

When the above WLAN auto-pairing procedure is accomplished, the second WLAN control circuit 524 and the first WLAN control circuit 514 perform the operation 612 to establish a WLAN connection between the source wireless device 510 and the destination wireless device 520. That is, a WLAN connection between the first WLAN communication circuit 512 and the second WLAN communication circuit 522 is established in the operation 612.

It can be appreciated from the foregoing descriptions that when the source wireless device 510 operates under the inquiry scan mode, the user only needs to conduct a simple manipulation to the trigger device 130 coupled with the destination wireless device 520, such as pressing a button, activating a switch, or the like. Then the destination wireless device 520 would automatically initiate the Bluetooth pairing procedure with the source wireless device 510 to establish Bluetooth bonds. Then, the destination wireless device 520 would automatically initiate the WLAN pairing procedure with the source wireless device 510 to establish the WLAN connection. In the entire processes of conducting the Bluetooth pairing, establishing the Bluetooth bonds, conducting the WLAN pairing, and establishing the WLAN connection, the user is not required to issue the Bluetooth scan command, to issue the WLAN scan command, or to choose a target device to be paired. As a result, the required user intervention or interaction is significantly reduced to the minimal level.

Therefore, the disclosed structure of the wireless communication system 500 effectively simplifies the WLAN pairing procedure between two wireless devices, and greatly improves the utilization convenience for the user.

Figure 7:
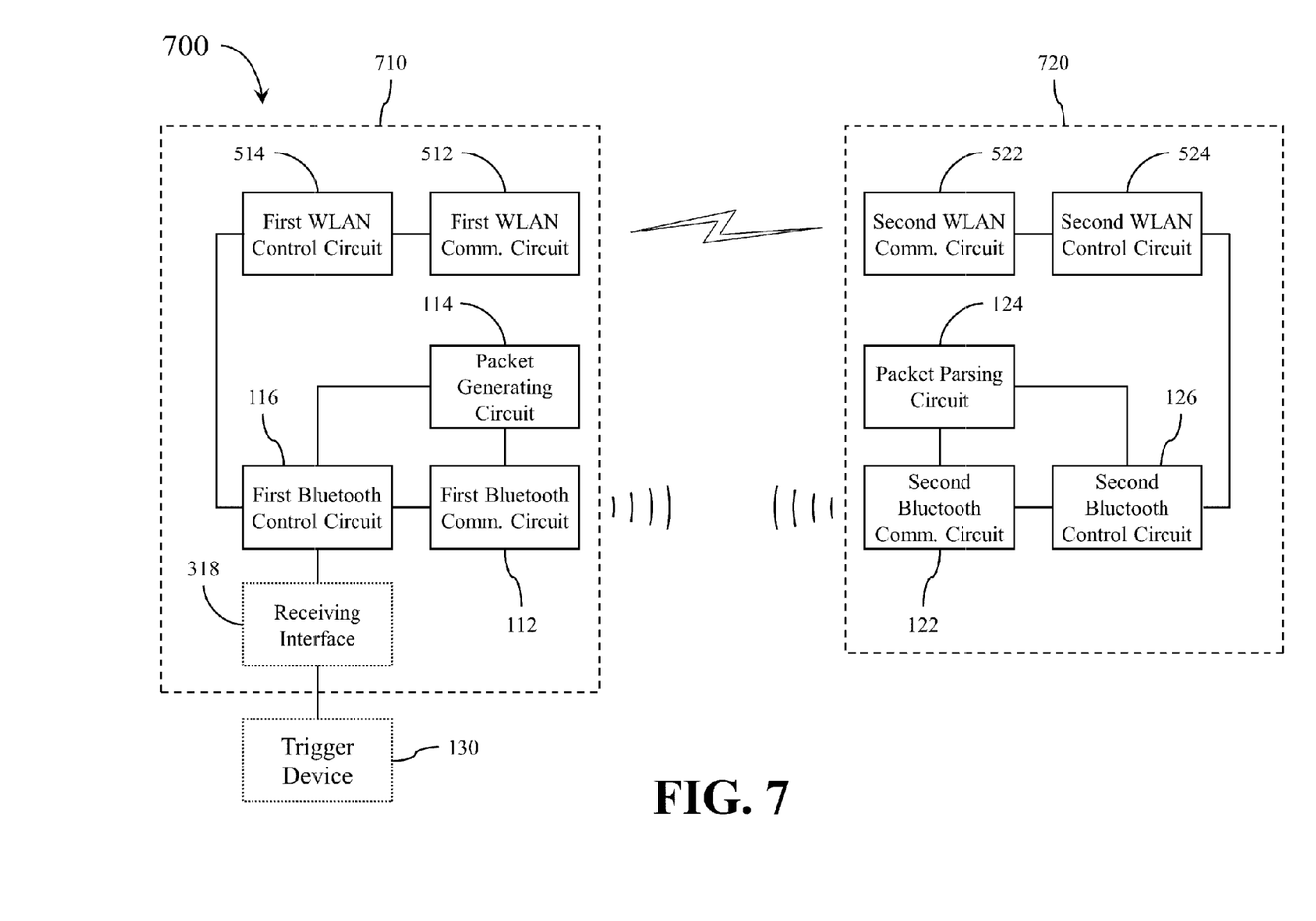
FIG. 7 shows a simplified functional block diagram of a wireless communication system according to a fourth embodiment of the present disclosure.

FIG. 7 shows a simplified functional block diagram of a wireless communication system 700 according to a fourth embodiment of the present disclosure. The wireless communication system 700 comprises a source wireless device 710 and a destination wireless device 720. The source wireless device 710 is similar to the aforementioned source wireless device 310, but the source wireless device 710 further comprises the first WLAN communication circuit 512 and the first WLAN control circuit 514 described previously. The first WLAN control circuit 514 is coupled with the first Bluetooth control circuit 116 and the first WLAN communication circuit 512.

In practice, different functional blocks of the source wireless device 710 may be realized with separate circuits, or may be integrated into a single circuit chip. In addition, each of the first Bluetooth communication circuit 112 and the first WLAN communication circuit 512 may be coupled with additional antenna devices (not shown) if needed.

The destination wireless device 720 is similar to the aforementioned destination wireless device 320, but the destination wireless device 720 further comprises the second WLAN communication circuit 522 and the second WLAN control circuit 524 described previously. The second WLAN control circuit 524 is coupled with the second Bluetooth control circuit 126 and the second WLAN communication circuit 522.

Similarly, different functional blocks of the destination wireless device 720 may be realized with separate circuits, or may be integrated into a single circuit chip. In addition, each of the second Bluetooth communication circuit 122 and the second WLAN communication circuit 522 may be coupled with additional antenna devices (not shown) if needed.

The foregoing descriptions regarding the implementations, connections, and operations of other corresponding functional blocks in the wireless communication system 300 are also applicable to the wireless communication system 700. For the sake of brevity, those descriptions will not be repeated here.

The operations of the wireless communication system 700 will be further described in the following by reference to FIG. 8.

Figure 8:
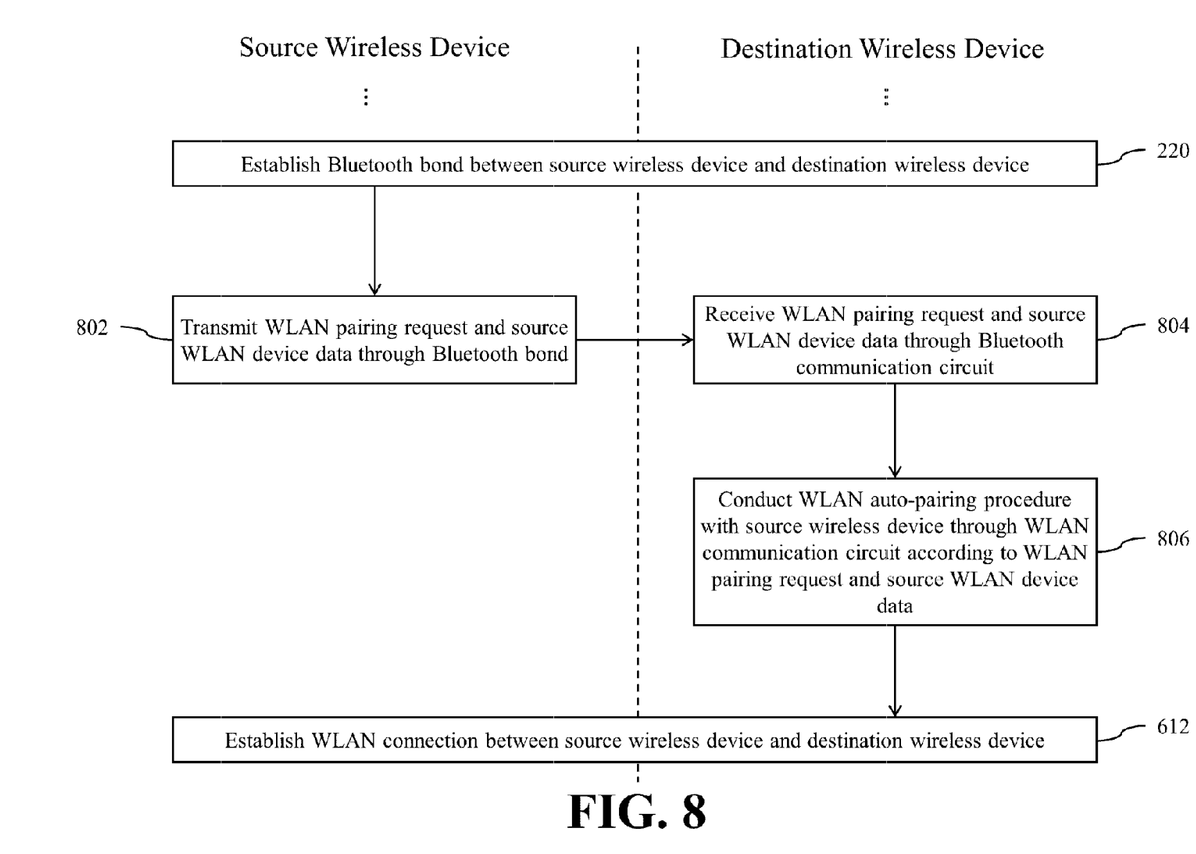
FIG. 8 shows a simplified flowchart of a method for conducting auto-pairing between wireless devices according to a fourth embodiment of the present disclosure.

FIG. 8 shows a simplified flowchart of a method for conducting auto-pairing between wireless devices according to a fourth embodiment of the present disclosure.

When the user wants to instruct the source wireless device 710 to automatically conduct WLAN pairing with other wireless devices, the user may conduct predetermined manipulation to the trigger device 130 so as to instruct the trigger device 130 to generate a corresponding user trigger signal. At this time, the source wireless device 710 and the destination wireless device 720 first conduct the operations 402~220 illustrated in FIG. 4 to accomplish a Bluetooth pairing procedure and establish one or more Bluetooth bonds between the source wireless device 710 and the destination wireless device 720. That is, the source wireless device 710 and the destination wireless device 720 establish one or more Bluetooth bonds between the first Bluetooth communication circuit 112 and the second Bluetooth communication circuit 122.

Then, the first WLAN control circuit 514 performs the operation 802 to instruct the second Bluetooth control circuit 126 to transmit a WLAN pairing request and the aforementioned source WLAN device data to the destination wireless device 720 through the one or more established Bluetooth bonds. At this time, the first Bluetooth control circuit 116 controls the first Bluetooth communication circuit 112 to transmit the WLAN pairing request and the source WLAN device data to the second Bluetooth communication circuit 122 of the destination wireless device 720 through the Bluetooth bonds. The term "WLAN pairing request" as used throughout the description and the claims refers to any indication information or command for requesting another wireless device to actively conduct a WLAN pairing procedure with the source wireless device 710.

In the operation 804, the second Bluetooth control circuit 126 receives the WLAN pairing request and the source WLAN device data transmitted from the first Bluetooth communication circuit 112 through the second Bluetooth communication circuit 122. At this time, the second Bluetooth control circuit 126 transmits the WLAN pairing request and the source WLAN device data to the second WLAN control circuit 524.

In the operation 806, the second WLAN control circuit 524 conducts a WLAN auto-pairing procedure with the source wireless device 710 through the second WLAN communication circuit 522 according to the WLAN pairing request and the source WLAN device data. According to the WLAN pairing request the second WLAN control circuit 524 may be notified of that the source wireless device 710 allows other devices to conduct WLAN pairing with the source wireless device 710. In addition, the second WLAN control circuit 524 may obtain the network protocol address of the source wireless device 710, the physical address of the source wireless device 710, the SSID of the source wireless device 710, the data rate of the source wireless device 710, or other data for use in conducting the WLAN pairing procedure based on the source WLAN device data. Accordingly, the second WLAN control circuit 524 automatically conducts the WLAN pairing procedure with the source wireless device 710 through the second WLAN communication circuit 522, but does not generate a list of available WLAN devices for the user to choose. In other words, the destination wireless device 720 requires no user intervention or interaction in the operation 806.

When the above WLAN auto-pairing procedure is accomplished, the second WLAN control circuit 524 and the first WLAN control circuit 514 perform the operation 612 to establish a WLAN connection between the source wireless device 710 and the destination wireless device 720. That is, a WLAN connection between the first WLAN communication circuit 512 and the second WLAN communication circuit 522 is established in the operation 612.

It can be appreciated from the foregoing descriptions that when the destination wireless device 720 operates in the status capable of receiving Bluetooth advertising packets, the user only needs to conduct a simple manipulation to the trigger device 130 coupled with the source wireless device 710, such as pressing a button, activating a switch, or the like. Then the source wireless device 710 would automatically initiate the Bluetooth pairing procedure with the destination wireless device 720 to establish Bluetooth bonds. Then, the source wireless device 710 would automatically initiate the WLAN pairing procedure with the destination wireless device 720 to establish the WLAN connection. In the entire processes of conducting the Bluetooth pairing, establishing the Bluetooth bonds, conducting the WLAN pairing, and establishing the WLAN connection, the user is not required to issue the Bluetooth scan command, to issue the WLAN scan command, or to choose a target device to be paired. As a result, the required user intervention or interaction is significantly reduced to the minimal level.

Therefore, the disclosed structure of the wireless communication system 700 further simplifies the WLAN pairing procedure between two wireless devices, and greatly improves the utilization convenience for the user.

In addition, the previous embodiments do not restrict the versions of Bluetooth standard supported by the wireless devices, and thus the structures of the disclosed embodiments could be widely applied in various Bluetooth standards.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A wireless communication system (100; 300; 500; 700), comprising:
    a source wireless device (110; 310; 510; 710), comprising:
        a first Bluetooth communication circuit (112);
        a packet generating circuit (114), coupled with the first Bluetooth communication circuit (112), configured to operably insert an auto-pairing request and one or more source Bluetooth device addresses into one or more predetermined advertising packets to form one or more target advertising packets; and
        a first Bluetooth control circuit (116), coupled with the first Bluetooth communication circuit (112) and the packet generating circuit (114), configured to operably control the first Bluetooth communication circuit (112) to transmit the one or more target advertising packets through a non-optical transmission approach; and
    a destination wireless device (120; 320; 520; 720), comprising:
        a second Bluetooth communication circuit (122), configured to operably receive the one or more target advertising packets without optically scanning any image shown on the source wireless device(110; 310; 510; 710);
        a packet parsing circuit (124), coupled with the second Bluetooth communication circuit (122), configured to operably parse the one or more target advertising packets to extract the auto-pairing request and the one or more source Bluetooth device addresses; and
        a second Bluetooth control circuit (126), coupled with the second Bluetooth communication circuit (122) and the packet parsing circuit (124), configured to operably conduct a Bluetooth auto-pairing procedure with the source wireless device (110; 310; 510; 710) corresponding to the one or more source Bluetooth device addresses through the second Bluetooth communication circuit (122) according to the auto-pairing request and the one or more source Bluetooth device addresses to establish one or more Bluetooth bonds between the first Bluetooth communication circuit (112) and the second Bluetooth control circuit (126);
    wherein each of the one or more predetermined advertising packets is an advertising indication packet, a non-connectable advertising indication packet, or a discoverable advertisement indication packet.

2. The wireless communication system of claim 1, wherein the destination wireless device further comprises:
    a receiving interface, coupled with the second Bluetooth control circuit, configured to operably receive a user trigger signal generated by a trigger device;
    wherein when the user trigger signal is received by the receiving interface, the second Bluetooth control circuit controls the second Bluetooth communication circuit to issue a Bluetooth inquiry signal, and if the Bluetooth inquiry signal is received by the first Bluetooth communication circuit while the first Bluetooth communication circuit operates under an inquiry scan mode, the packet generating circuit inserts the auto-pairing request and the one or more source Bluetooth device addresses into the one or more predetermined advertising packets to form the one or more target advertising packets.

3. The wireless communication system of claim 1, where the source wireless device further comprises:
    a receiving interface, coupled with the first Bluetooth control circuit, configured to operably receive a user trigger signal generated by a trigger device;
    wherein when the user trigger signal is received by the receiving interface, the packet generating circuit inserts the auto-pairing request and the one or more source Bluetooth device addresses into the one or more predetermined advertising packets to form the one or more target advertising packets, and the first Bluetooth control circuit controls the first Bluetooth communication circuit to enter a Bluetooth advertising mode to transmit the one or more target advertising packets.

4. The wireless communication system of claim 1, wherein the source wireless device further comprises:
    a first WLAN communication circuit; and
    a first WLAN control circuit, coupled with the first Bluetooth control circuit and the first WLAN communication circuit;
    wherein the destination wireless device further comprises:
    a second WLAN communication circuit; and
    a second WLAN control circuit, coupled with the second Bluetooth control circuit and the second WLAN communication circuit;
    wherein the first WLAN control circuit instructs the first Bluetooth control circuit to control the first Bluetooth communication circuit to transmit a source WLAN device data to the second Bluetooth communication circuit through the one or more Bluetooth bonds, and the second WLAN control circuit conducts a WLAN auto-pairing procedure with the source wireless device through the second WLAN communication circuit according to the source WLAN device data to establish a WLAN connection between the first WLAN communication circuit and the second WLAN communication circuit.

5. The wireless communication system of claim 4, wherein the destination wireless device further comprises:
    a receiving interface, coupled with the second Bluetooth control circuit, configured to operably receive a user trigger signal generated by a trigger device;
    wherein when the user trigger signal is received by the receiving interface, the second Bluetooth control circuit controls the second Bluetooth communication circuit to issue a Bluetooth inquiry signal, and if the Bluetooth inquiry signal is received by the first Bluetooth communication circuit while the first Bluetooth communication circuit operates under an inquiry scan mode, the packet generating circuit inserts the auto-pairing request and the one or more source Bluetooth device addresses into the one or more predetermined advertising packets to form the one or more target advertising packets.

6. The wireless communication system of claim 5, wherein the second WLAN control circuit instructs the second Bluetooth control circuit to control the second Bluetooth communication circuit to transmit a WLAN device data request to the first Bluetooth communication circuit through the one or more Bluetooth bonds, so as to request the source wireless device to provide the source WLAN device data.

7. The wireless communication system of claim 4, wherein the source wireless device further comprises:
    a receiving interface, coupled with the first Bluetooth control circuit, configured to operably receive a user trigger signal generated by a trigger device;

wherein when the user trigger signal is received by the receiving interface, the packet generating circuit inserts the auto-pairing request and the one or more source Bluetooth device addresses into the one or more predetermined advertising packets to form the one or more target advertising packets, and the first Bluetooth control circuit controls the first Bluetooth communication circuit to enter a Bluetooth advertising mode to transmit the one or more target advertising packets.

8. The wireless communication system of claim 7, wherein the first WLAN control circuit instructs the first Bluetooth control circuit to control the first Bluetooth communication circuit to transmit a WLAN pairing request and the source WLAN device data to the second Bluetooth communication circuit through the one or more Bluetooth bonds, and the second WLAN control circuit conducts the WLAN auto-pairing procedure with the source wireless device through the second WLAN communication circuit according to the WLAN pairing request and the source WLAN device data.

9. A source wireless device (110; 310; 510; 710) for use in a wireless communication system (100; 300; 500; 700), the source wireless device (110; 310; 510; 710) comprising:
- a first Bluetooth communication circuit (112);
- a packet generating circuit (114), coupled with the first Bluetooth communication circuit (112), configured to operably insert an auto-pairing request and one or more source Bluetooth device addresses into one or more predetermined advertising packets to form one or more target advertising packets; and
- a first Bluetooth control circuit (116), coupled with the first Bluetooth communication circuit (112) and the packet generating circuit (114), configured to operably control the first Bluetooth communication circuit (112) to transmit the one or more target advertising packets through a non-optical transmission approach;
- wherein each of the one or more predetermined advertising packets is an advertising indication packet, a non-connectable advertising indication packet, or a discoverable advertisement indication packet.

10. The source wireless device of claim 9, wherein if a Bluetooth inquiry signal is received by the first Bluetooth communication circuit while the first Bluetooth communication circuit operates under an inquiry scan mode, the packet generating circuit inserts the auto-pairing request and the one or more source Bluetooth device addresses into the one or more predetermined advertising packets to form the one or more target advertising packets.

11. The source wireless device of claim 9, further comprising:
- a receiving interface, coupled with the first Bluetooth control circuit, configured to operably receive a user trigger signal generated by a trigger device;
- wherein when the user trigger signal is received by the receiving interface, the packet generating circuit inserts the auto-pairing request and the one or more source Bluetooth device addresses into the one or more predetermined advertising packets to form the one or more target advertising packets, and the first Bluetooth control circuit controls the first Bluetooth communication circuit to enter a Bluetooth advertising mode to transmit the one or more target advertising packets.

12. The source wireless device of claim 9, further comprising:
- a first WLAN communication circuit; and
- a first WLAN control circuit, coupled with the first Bluetooth control circuit and the first WLAN communication circuit;
- wherein the first WLAN control circuit instructs the first Bluetooth control circuit to control the first Bluetooth communication circuit to transmit a source WLAN device data to a destination wireless device through the one more Bluetooth bonds, and the destination wireless device conducts a WLAN auto-pairing procedure with the source wireless device through a second WLAN communication circuit according to the source WLAN device data to establish a WLAN connection between the first WLAN communication circuit and the second WLAN communication circuit.

13. The source wireless device of claim 12, wherein if a Bluetooth inquiry signal is received by the first Bluetooth communication circuit while the first Bluetooth communication circuit operates under an inquiry scan mode, the packet generating circuit inserts the auto-pairing request and the one or more source Bluetooth device addresses into the one or more predetermined advertising packets to form the one or more target advertising packets.

14. The source wireless device of claim 12, further comprising:
- a receiving interface, coupled with the first Bluetooth control circuit, configured to operably receive a user trigger signal generated by a trigger device;
- wherein when the user trigger signal is received by the receiving interface, the packet generating circuit inserts the auto-pairing request and the one or more source Bluetooth device addresses into the one or more predetermined advertising packets to form the one or more target advertising packets, and the first Bluetooth control circuit controls the first Bluetooth communication circuit to enter a Bluetooth advertising mode to transmit the one or more target advertising packets.

15. The source wireless device of claim 14, wherein the first WLAN control circuit instructs the first Bluetooth control circuit to control the first Bluetooth communication circuit to transmit a WLAN pairing request and the source WLAN device data to the destination wireless device through the one or more Bluetooth bonds, and the destination wireless device conducts the WLAN auto-pairing procedure with the source wireless device through the second WLAN communication circuit according to the WLAN pairing request and the source WLAN device data.

16. A destination wireless device for use in a wireless communication system, the destination wireless device comprising:
- a second Bluetooth communication circuit, configured to operably receive one or more target advertising packets without optically scanning any image shown on other device;
- a packet parsing circuit, coupled with the second Bluetooth communication circuit, configured to operably parse the one or more target advertising packets to extract an auto-pairing request and one or more source Bluetooth device addresses; and
- a second Bluetooth control circuit, coupled with the second Bluetooth communication circuit and the packet parsing circuit, configured to operably conduct a Bluetooth auto-pairing procedure with a source wireless device corresponding to the one or more source Bluetooth device addresses through the second Bluetooth communication circuit according to the auto-pairing request and the one or more source Bluetooth device addresses to establish one or more Bluetooth bonds between the second Bluetooth control circuit and a first Bluetooth communication circuit of the source wireless device;

wherein each of the one or more predetermined advertising packets is an advertising indication packet, a non-connectable advertising indication packet, or a discoverable advertisement indication packet.

17. The destination wireless device of claim 16, further comprising:
a receiving interface, coupled with the second Bluetooth control circuit, configured to operably receive a user trigger signal generated by a trigger device;
wherein when the user trigger signal is received by the receiving interface, the second Bluetooth control circuit controls the second Bluetooth communication circuit to issue a Bluetooth inquiry signal, and if the Bluetooth inquiry signal is received by the first Bluetooth communication circuit while the first Bluetooth communication circuit operates under an inquiry scan mode, the source wireless device inserts the auto-pairing request and the one or more source Bluetooth device addresses into the one or more predetermined advertising packets to form the one or more target advertising packets.

18. The destination wireless device of claim 16, further comprising:
a second WLAN communication circuit; and
a second WLAN control circuit, coupled with the second Bluetooth control circuit and the second WLAN communication circuit;
wherein the second WLAN communication circuit receives a source WLAN device data transmitted from the source wireless device through the one or more Bluetooth bonds, and the second WLAN control circuit conducts a WLAN auto-pairing prcocedure with the source wireless device through the second WLAN communication circuit according to the source WLAN device data to establish a WLAN connection between the second WLAN communication circuit and a first WLAN communication circuit of the source wireless device.

19. The destination wireless device of claim 18, further comprising:
a receiving interface, coupled with the second Bluetooth control circuit, configured to operably receive a user trigger signal generated by a trigger device;
wherein when the user trigger signal is received by the receiving interface, the second Bluetooth control circuit controls the second Bluetooth communication circuit to issue a Bluetooth inquiry signal, and if the Bluetooth inquiry signal is received by the first Bluetooth communication circuit wile the first Bluetooth communication circuit operates under an inquiry scan mode, the source wireless device inserts the auto-pairing request and the one or more source Bluetooth device addresses into the one or more predetermined advertising packets to form the one or more target advertising packets.

20. The destination wireless device of claim 19, wherein the second WLAN control circuit instructs the second Bluetooth control circuit to control the second Bluetooth communication circuit to transmit a WLAN device data request to the first Bluetooth communication circuit through the one or more Bluetooth bonds, so as to request the source wireless device to provide the source WLAN device data.

21. The destination wireless device of claim 18, wherein the second Bluetooth communication circuit receives a WLAN pairing request transmitted from the source wireless device through the one or more Bluetooth bonds, and the second WLAN control circuit conducts the WLAN auto-pairing procedure with the source wireless device through the second WLAN communication circuit according to the WLAN pairing request and the source WLAN device data.

\* \* \* \* \*

UNITED STATES PATENT AND TRADEMARK OFFICE
CERTIFICATE OF CORRECTION

PATENT NO.         : 9,781,545 B2
APPLICATION NO.    : 14/684993
DATED              : October 3, 2017
INVENTOR(S)        : Wei-Feng Mao et al.

It is certified that error appears in the above-identified patent and that said Letters Patent is hereby corrected as shown below:

On the Title Page

At item (72), Inventors, change "Yong Liu, Jiangsu (TW)" to --Yong Liu, Jiangsu (CN)--.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*